United States Patent
Huber et al.

(10) Patent No.: US 10,690,177 B2
(45) Date of Patent: Jun. 23, 2020

(54) CONNECTING ROD FOR INTERNAL COMBUSTION MACHINE WITH VARIABLE COMPRESSION

(71) Applicant: ECO Holding 1 GmbH, Marktheidenfeld (DE)

(72) Inventors: David Huber, Aschaffenburg (DE); Stefanie Hutzelmann, Gaefendorf (DE); Dietmar Schulze, Muezenberg (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 15/876,292

(22) Filed: Jan. 22, 2018

(65) Prior Publication Data

US 2018/0238382 A1    Aug. 23, 2018

(30) Foreign Application Priority Data

Feb. 20, 2017  (DE) .......................... 10 2017 103 379
Sep. 19, 2017  (DE) .......................... 10 2017 121 630

(51) Int. Cl.
*F16C 7/06*    (2006.01)
*F02B 75/04*   (2006.01)
(Continued)

(52) U.S. Cl.
CPC .............. *F16C 7/06* (2013.01); *F02B 75/045* (2013.01); *F16C 23/10* (2013.01); *B22D 17/00* (2013.01);
(Continued)

(58) Field of Classification Search
CPC ........ F16C 7/06; F16C 23/10; F16C 2220/04; F16C 2226/36; F16C 2360/22; F02B 75/045; B22D 17/00
See application file for complete search history.

(56) References Cited

U.S. PATENT DOCUMENTS

| 2015/0059683 A1* | 3/2015 | Schulze ................ F02B 75/045 123/197.3 |
| 2015/0233288 A1* | 8/2015 | Paul ...................... F02B 75/045 123/48 B |
| 2017/0260899 A1* | 9/2017 | Mudra ................... F15B 15/02 |

FOREIGN PATENT DOCUMENTS

| CN | 104420989 A | 3/2015 |
| DE | 102011002138 | 10/2012 |

(Continued)

*Primary Examiner* — Syed O Hasan
(74) *Attorney, Agent, or Firm* — Von Rohrscheidt Patents (57) ABSTRACT

A connecting rod for a variable compression internal combustion engine, the connecting rod including a crank bearing eye for connecting the connecting rod with a crankshaft of the internal combustion engine; a connecting rod bearing eye for connecting the connecting rod with a cylinder piston of the internal combustion engine; an eccentrical element adjustment arrangement for adjusting an effective connecting rod length, wherein the eccentrical element adjustment arrangement includes an eccentrical element that cooperates with an eccentrical element lever and that is connected torque proof with the eccentrical element lever, wherein a wrist pin of the cylinder piston is receivable in the eccentrical element, wherein the eccentrical element adjustment arrangement includes two cylinders with a respective piston that is supported in a cylinder bore and connected with a respective support rod, wherein the eccentrical element lever includes one or plural eccentrical element lever segments.

16 Claims, 4 Drawing Sheets

(51) Int. Cl.
*F16C 23/10* (2006.01)
*B22D 17/00* (2006.01)
(52) U.S. Cl.
CPC ...... *F16C 2220/04* (2013.01); *F16C 2226/36* (2013.01); *F16C 2360/22* (2013.01)

(56) References Cited

FOREIGN PATENT DOCUMENTS

| | | |
|---|---|---|
| DE | 102014100585 A1 | 1/2015 |
| DE | 102014100585 | 2/2015 |
| DE | 102013014090 | 3/2015 |
| DE | 102014109452 | 1/2016 |
| DE | 102015103202 | 9/2016 |
| DE | 102015109922 | 9/2016 |
| DE | 102015109580 | 10/2016 |

* cited by examiner

CONNECTING ROD FOR INTERNAL COMBUSTION MACHINE WITH VARIABLE COMPRESSION

RELATED APPLICATIONS

This application claims priority from and incorporates by reference German Patent applications DE 10 2017 103 379.3 filed on Feb. 20, 2017 DE 10 2017 121 630.8 filed on Sep. 15, 2017.

FIELD OF THE INVENTION

The invention relates to a connecting rod for a variable compression internal combustion engine and a variable compression internal combustion engine with the connecting rod.

BACKGROUND OF THE INVENTION

In internal combustion engines a high compression ratio has a positive effect upon efficiency of the internal combustion engine. Compression ratio is typically designated as a ratio of an entire cylinder volume before compression divided by a remaining cylinder volume after the compression. In internal combustion engines with external ignition in particular gasoline engines which have a fixed compression ratio, the compression ratio, however, must only be selected up to a level where a so called knocking of the internal combustion engine under full load operations is avoided. However, the compression ratio can be selected with higher values for the much more prevalent partial load operation of the internal combustion engine, thus with a low cylinder charge, without the knocking occurring. The important partial load operations of an internal combustion engine can be improved when the compression ratio is variably adjustable. In order to adjust the compression ratio systems with variable connecting rod length are known which actuate an eccentrical element adjustment arrangement of a connecting rod using hydraulic switch valves.

DE 10 2014 100 585 A1 describes a connecting rod for a variable compression internal combustion engine with an eccentrical element adjustment arrangement wherein, a connecting rod bearing eye, the eccentrical element and the eccentrical element lever respectively have a beveled contour.

BRIEF SUMMARY OF THE INVENTION

Thus, it is an object of the invention to provide an improved economical connecting rod for a variable compression internal combustion engine wherein the connecting rod can be produced reliably.

It is another object of the invention to provide a variable compression internal combustion engine with the connecting rod.

A connecting rod for a variable compression internal combustion engine is proposed, the connecting rod including a crank bearing eye for connecting the connecting rod to a crankshaft of the internal combustion engine, a connecting rod bearing eye for connecting the connecting rod to a cylinder piston of the internal combustion engine, and an eccentrical element adjustment arrangement for adjusting an effective connecting rod length, wherein the eccentrical element adjustment arrangement includes an eccentrical element that cooperates with an eccentrical element lever and is connected torque proof with the eccentrical element lever, wherein a wrist pin of the cylinder piston is receivable in the eccentrical element. The eccentrical element adjustment arrangement includes two cylinders with a respective piston that is supported in a cylinder bore and connected with a support rod. The eccentrical element lever includes one or plural eccentrical element lever segments and is pivotably connected with the support rods. The connecting rod bearing eye and the eccentrical element include first portions with first face contours and second portions with second face contours. According to the invention the eccentrical element lever envelopes the eccentrical element exclusively in the first portion of the eccentrical element.

The connecting rod according to the invention includes an eccentrical element adjustment arrangement with an eccentrical element lever with a configuration that is improved over the prior art. The eccentrical element lever includes one or plural eccentrical element lever segments which are connected with the eccentrical element, but envelope the eccentrical element only in a first portion. The eccentrical element lever also does not have the typical 4° slant angle. Overall the eccentrical element lever which can be produced in a reliable manner is more cost effective and lighter than comparable prior art components.

A beveled portion of the eccentric element lever can thus be omitted with the solution of the eccentrical element lever according to the invention and the eccentrical element lever that can be configured in two components with two eccentrical element lever segments then typically only has flat connection sections that are parallel to each other and which are connected torque proof with the eccentrical element. The connection sections respectively envelop a first portion of the eccentrical element and of the connecting rod eye with a semicircular inner surface and are configured flat at least in portions.

Advantageously omitting an upper bevel eccentrical element lever section achieves a lower scrap rate in a fine stamping production process in the course of the fabrication of the connecting rod.

An overall mass of the connecting rod, in particular an oscillating mass of the connecting rod can be reduced over the prior art. The eccentrical element can be angled steeper and thus become lighter. This in turn has a positive effect upon vibration of the connecting rod and thus on a fuel burn of an internal combustion which is operated with the connecting rod.

A clear space in the piston of the internal combustion engine can be further increased. The increased installation space facilitates using a less expensive and installation space optimized cylinder piston.

The eccentrical element lever or its eccentrical lever segments are welded together with the eccentrical element. A laser welding method is advantageously used as a welding method. According to the invention the laser welding method for connecting the eccentrical element lever and the eccentrical element can be simplified during fabrication of the connecting rod since the entire weld seam is in a two dimensional plane so that the laser beam does not have to track along a three dimensional contour. By omitting a typically required weld seem in the beveled eccentrical element section less heat is introduced into the components during laser welding since the eccentrical lever segments envelop the eccentrical element only in portions so that reduced warping of the eccentrical element lever can be achieved.

According to an advantageous embodiment the first portions can have face contours that are parallel to each other and the second portions can have beveled face contours.

This way installation space required by the connecting rod in the cylinder of the internal combustion engine can be further reduced so that cylinder pistons can be used that have piston contours that are better adapted to combustion, Furthermore the weight can be saved in the connecting rod which in turn reduces fuel burn of the internal combustion engine.

According to an advantageous embodiment at least one shoulder can be configured between the first face contours and the second face contours, in particular the second face contours can have a smaller distance from each other than the first face contours. By configuring the face contours of the connecting rod bearing eye and the eccentrical element with shoulders the installation space of the connecting rod can be advantageously reduced even further. Additionally the total mass of the connecting rod and in particular of the oscillating portions of the connecting rod can be reduced which in turn reduces fuel burn of the internal combustion engine.

According to an advantageous embodiment the eccentrical lever segments can have connection sections that are parallel to each other and that are connected with the eccentrical element torque proof. The eccentrical lever segments are typically welded together with the eccentrical element. Parallel connection sections of the eccentrical element lever segments facilitate the welding process since the preassembly process is simplified and furthermore the weld seem for each eccentrical lever segment is in one plane and thus the laser beam does not have to track a three dimensional contour.

According to an advantageous embodiment the connection sections can have a semicircular inner surface which envelopes the first portion. The inner surface of the connection sections forms an interface towards the eccentrical element which is welded together for example with the eccentrical element and the connecting rod bearing eye, Since the eccentrical element has a circular contour a semicircular inner surface of the connection sections can be welded together with the eccentrical element particularly easily. A slight protrusion of the eccentrical element further facilitates the welding process so that the welding can be advantageously performed without additional material.

According to an advantageous embodiment the first portions can be oriented towards the crank bearing eye and/or the second portions can be oriented away from the crank bearing eye. Since the eccentrical element lever only envelopes the first portions of the eccentric element and of the connection rod bearing eye the eccentrical element lever is also connected with the eccentrical element on a side of the crank bearing eye. The load that is imparted upon the connecting rod by the combustion pressure is at a maximum on a side of the connection between the eccentric element and the eccentrical element lever which side is oriented towards the crank bearing eye. This arrangement of eccentrical element and eccentrical element lever according to the invention advantageously facilitates reacting the load.

According to an advantageous embodiment a separation line between the first portion and the second portion can extend through the eccentrical element axis. This arrangement of the separation line between the first portion and the second portion has a positive influence upon the required installation space and also the weight of the connecting rod which facilitates advantageous cylinder piston shapes and also economical fuel burn of the internal combustion engine.

According to an advantageous embodiment the connection sections can be configured flat at least in portions. The eccentrical element lever segments are typically welded to the eccentrical element. Flat surfaces of the connection sections of the eccentrical element lever segments facilitate the welding process since the preassembly process is facilitated and furthermore the weld seem for each eccentrical element lever segment is in one plane so that the laser beam does not have to track a three dimensional contour.

According to an advantageous embodiment the eccentrical element lever can be configured from steel investment cast material. This way the eccentrical lever segments can be configured in a particular cost effective manner in a reliable process.

According to an advantageous embodiment the eccentrical element lever can be produced by a metal injection molding method. Alternatively also the eccentrical element lever segments can also be produced by a metal injection molding method (MIM) in order to achieve economical and reliably produced components.

According to an advantageous embodiment the support rods can be linked to the eccentrical element lever by connecting bolts. This connection of the support rods at the eccentrical element lever by connecting bolts facilitates a large movement range of the eccentrical element adjustment arrangement. Assembly of a connecting rod of this type can thus be advantageously performed.

According to an advantageous embodiment the support rods can be pivotally linked at the eccentrical element lever by a ball joint. Alternatively also connecting the support rods at the eccentrical element lever by a ball joint is advantageous because a respective movement clearance of the eccentrical element lever and the support rods relative to each other can be advantageously provided. This facilitates configuring the geometry of the cylinder pistons for an advantageous combustion process.

According to an advantageous embodiment the eccentrical element lever can be welded to the eccentrical element. A welding process can establish a particularly reliable connection between the components, eccentrical lever segments and eccentrical element also for the particularly stringent requirements of an adjustable connecting rod of an internal combustion engine. In particular the welding process facilitates a reliable connection of eccentrical element segments and eccentrical element for a connection only in a first portion of connecting rod bearing eye and eccentrical element.

According to an advantageous embodiment the eccentrical element lever can be welded along an inner surface with the eccentrical element. The inner surface of the connection sections represents the interface towards the eccentrical element which is for example welded together with the eccentrical element and the connecting rod bearing eye. Since the eccentrical element does not have a circular outer contour a semicircular inner surface of the connection sections can be welded to the eccentrical element particularly easily. A smaller protrusion of the eccentrical element furthermore facilitates the welding process so that welding can be advantageously performed without additional material.

According to another aspect of the invention, an internal combustion engine with at least one connection rod is proposed. Thus advantageously a connecting rod as described supra is used in order to implement an eccentrical element adjustment arrangement in an advantageous manner and to achieve an advantageous combustion process and thus lower fuel burn.

BRIEF DESCRIPTION OF THE DRAWINGS

Further advantages can be derived from the subsequent drawing descriptions schematically illustrating an embodiment of the invention, wherein.

DETAILED DESCRIPTION OF THE INVENTION

FIGS. 1 through 4 schematically illustrate a connecting rod 1 for a variable compression internal combustion engine in a first position with high compression including an eccentrical element adjustment arrangement 2 for adjusting an effective connecting rod length which is defined as a distance of a center axis of a crank bearing eye 12 from a center axis of a bore of an eccentrical element 4. FIGS. 6 through 9 show the connecting rod 1 in a second position with low compression.

Figure 1:
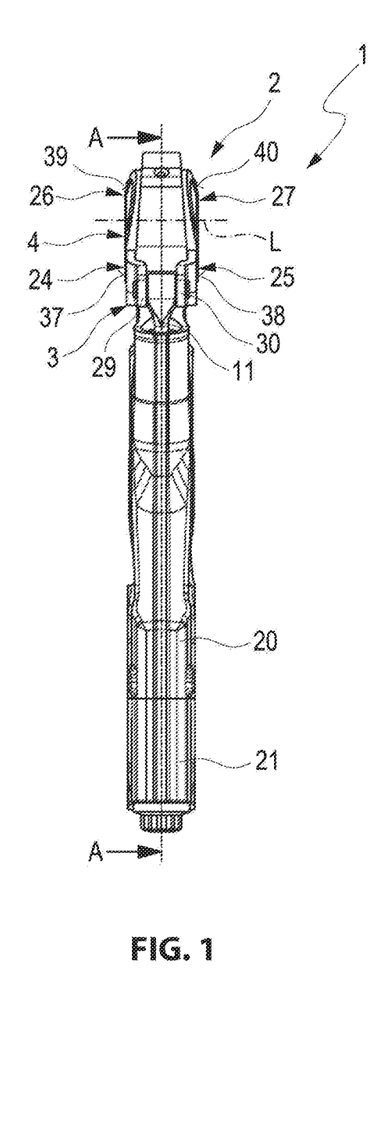
FIG. 1 illustrates a side view of A connecting rod according to the invention in a first position with an illustrated section plane A-A.
Figure 2:
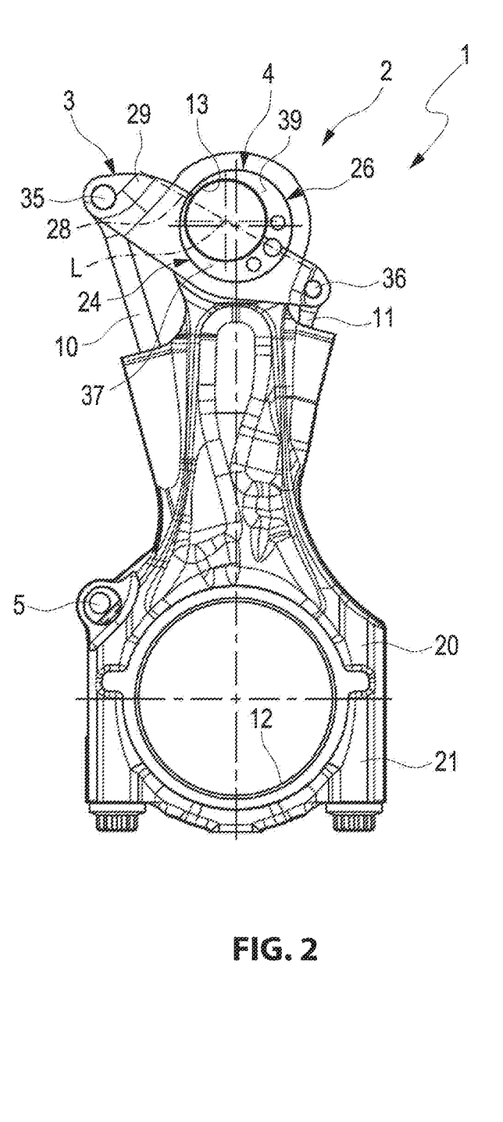
FIG. 2 illustrates a front view of the connecting rod according to FIG. 1.
Figure 3:
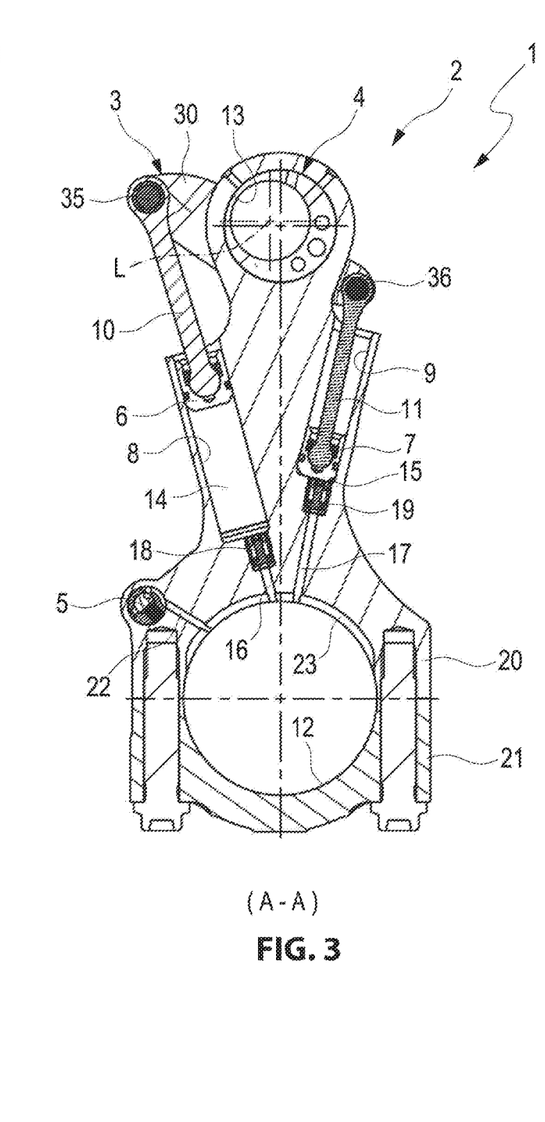
FIG. 3 illustrates a longitudinal sectional view in the sectional plane A-A of the connecting rod according to FIG. 1.
Figure 4:
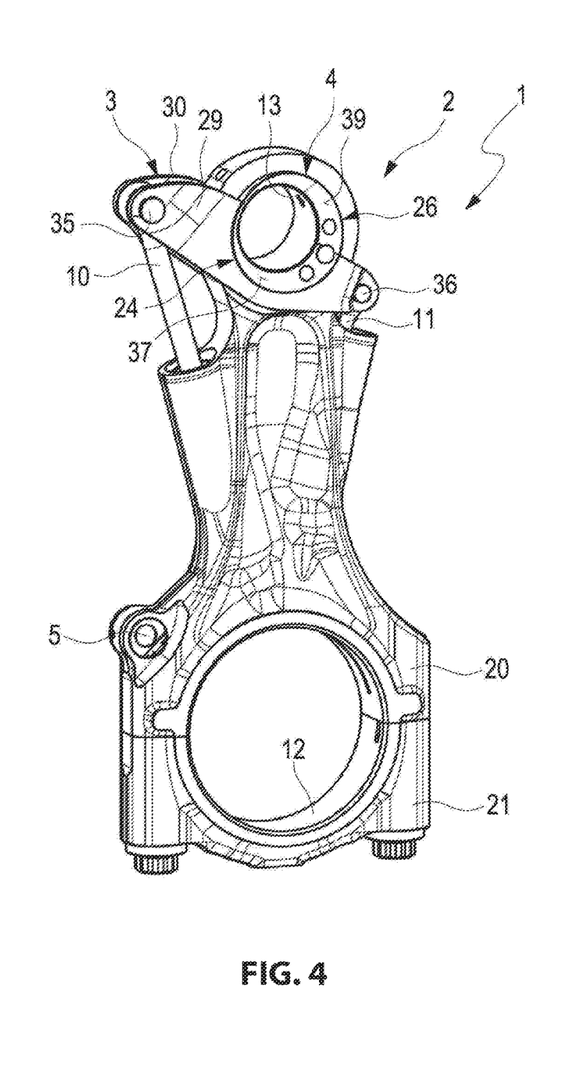
FIG. 4 illustrates a perspective view according to FIG. 1.

FIG. 1 illustrates a side view of the connecting rod 1 according to the invention in a first position for high compression with a designated sectional plane A-A. FIG. 2 illustrates a front view of the connecting rod 1 according to FIG. 1 and FIG. 3 illustrates a longitudinal sectional view of the connecting rod 1 in the sectional plane A-A of the connecting rod according to FIG. 1 and FIG. 4 illustrates a perspective view of the connecting rod 1 according to FIG. 1. The position of the eccentrical element adjustment arrangement 2 corresponds to a high compression of the internal combustion engine. Thus, the effective connecting rod length, namely the distance between the center axis of the crank bearing eye and the center axis of the bore hole of the eccentrical element 4, namely the eccentrical element axis L has a maximum value.

As evident from FIGS. 1 through 4 the eccentrical element adjustment arrangement 2 includes an eccentrical element 4 that cooperates with a one component or multi component eccentrical element lever 3 in which a non-illustrated wrist pin of a cylinder piston is receivable. An adjustment travel of the eccentrical element adjustment arrangement 2 is adjustable by a switch valve 5.

A rotation of the eccentrical adjustable element arrangement 2 is initiated by an impact of mass and load forces of the internal combustion engine which impact the eccentrical element adjustment device 2 during an operating stroke of the internal combustion engine. During the operating stroke effective directions of forces impacting the eccentrical element adjustment arrangement 2 change continuously. The rotating movement movement or adjustment movement is supported by one or plural pistons 6, 7 that are loaded with hydraulic fluid, in particular motor oil and integrated in the connecting rod 1, or the pistons 6, 7 prevent a reset of the eccentrical element adjustment device 2 due to varying force effective directions of forces impacting the eccentrical element adjustment arrangement 2.

The pistons 6, 7 are respectively movably supported in a cylinder bore 8, 9 of a hydraulic cylinder 14, 15 of the connecting rod 1 and connected with support rods 10, 11 which are in turn pivotably linked at the eccentrical element lever 3.

The connecting rod 1 includes the crank bearing eye 12 to connect the connecting rod 1 to a crank shaft of an internal combustion engine and a connecting rod bearing eye 13 for connecting the connecting rod 1 with the cylinder piston of the internal combustion engine.

The pistons 6, 7 are respectively movably arranged in the cylinder bore holes 8, 9 of the cylinders 14, 15 configured as hydraulic chambers and loaded through inlets 16, 17 from the crank bearing eye 12 with hydraulic fluid, for example motor oil, through check valves 18, 19.

The check valves thus prevent a blowback of the hydraulic fluid from the hydraulic chambers 14, 15 into the inlets 16, 17, however they facilitate a pulling of the hydraulic fluid into the hydraulic chambers 14, 15.

The hydraulic chambers 14, 15 are furthermore connected through non illustrated drains with the switch valve 5 which can be configured as a hydraulic valve or a mechanical valve and which is connected through a drain conduit 22 with the crank bearing eye 12.

As evident for example form FIG. 3 the connecting rod 1 includes a connecting rod body 20 and a connecting rod cover 21 attached there to.

On a circumference of the crank bearing eye 12 a groove 23 is provided in the portion of the connecting rod body 20, wherein the inlets 16, 17 and the drain conduit 22 lead into the groove. Since the groove 23 is only arranged on a portion of a circumference of the crank bearing eye 12 a load bearing capability of the crank bearing eye 12 is only impaired by a minimal amount.

The configuration of the connecting rod 1 according to the invention is only illustrated in an exemplary manner and the eccentrical element lever according to the invention can also be used in other embodiments of the connecting rod with an eccentrical element adjustment arrangement. Thus, is it possible for example to arrange the switch valve 5 in the portion of the connecting rod cover 21. Furthermore the described check valves 18, 19 can be integrated in the switch valve 5. Also the hydraulic supply of the hydraulic chambers 14, 15 can deviate from the described embodiment.

Figure 5:
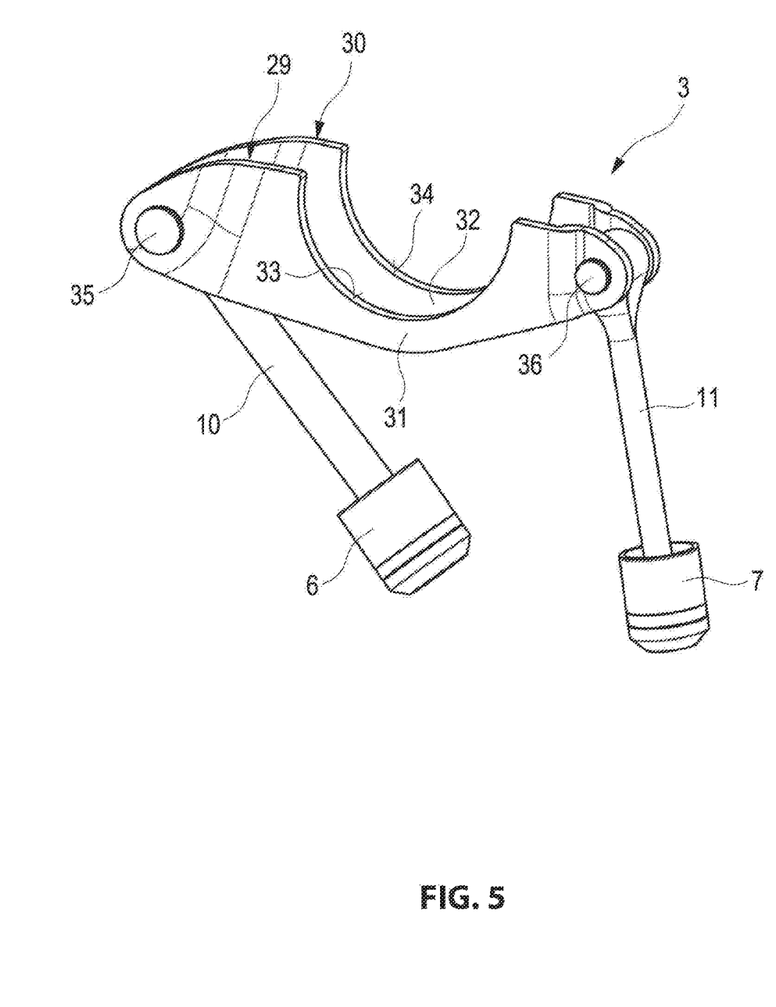
FIG. 5 illustrates a perspective view of the eccentrical element lever with linked support rods of the connecting rod according to FIG. 1.

The one or multi component eccentrical element lever cooperates with the eccentrical element 4 and is connected torque proof therewith. The eccentrical element lever 3 that is pivotally linked with the support rods 10, 11 is illustrated in FIG. 5 in a position of the connecting rod 1 for high compression and in FIG. 10 in a position for low compression.

Connecting rods that are known in the art and include an eccentrical element and an eccentrical element lever with a contour that is beveled in portions in order to save weight and in order to reduce fabrication and assembly complexity. Furthermore the installation space required for the eccentrical element adjustment arrangement can be reduced and its rotatability can be improved.

In order to provide a connecting rod for a variable compression internal combustion engine which connecting rod is improved with respect to cost and weight and which is furthermore producible in a reliable process it is provided according to the invention that the connecting rod bearing eye 13 and the eccentrical element 4 include a first face contour 37, 38 in first portions 24, 25 and a second face contour 39, 40 in second portions 26, 27 and the eccentrical element lever 3 envelopes the eccentrical element 4 exclusively in the first portion 24, 25 for the eccentrical element 4.

As evident from FIGS. 2 and 3 the first portions 24, 25 are oriented towards the crank bearing eye 12 and the second portions 26, 27 are oriented away from the crank bearing eye 12. Separation lines which separate the first and second portions 24, 25, 26, 27 can thus be positioned differently. The separation line 28 of the eccentrical element 4 is evident from FIG. 2 and extends through the eccentrical element axis L. In the embodiment illustrated in FIGS. 1 through 10 the first face contours 37, 38 are configured parallel to each other and the second face contours 39, 40 are respectively configured beveled.

Figure 7:
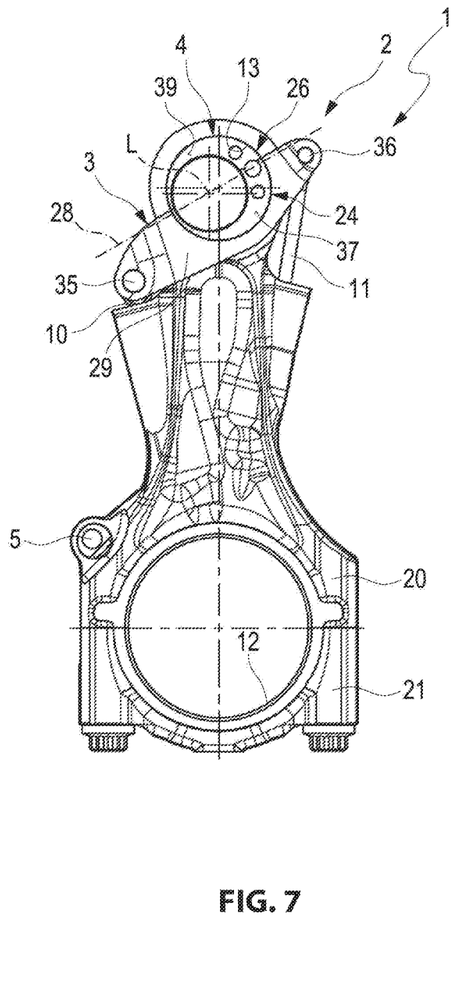
FIG. 7 illustrates a front view of the connecting rod according to FIG. 6.

In an alternative embodiment at least one shoulder can also be configured between the first face contours 37, 38 and the second face contours 39, 40 to coincide with the separation line 28 shown in FIGS. 2 and 7. In particular the second face contours 39, 40 can have a smaller distance from each other than the first face contours 37, 38. Also this embodiment saves installation space.

A beveled section of the eccentrical element lever 3 can be omitted when using the eccentrical element lever 3 according to the invention and the eccentrical element lever 3 that is configured in the embodiment illustrated in FIG. 5 with two eccentrical element lever segments 29, 30 thus only includes flat and parallel connection sections 31, 32 which are connected torque proof with the eccentrical element 4. The connection sections 31, 32 envelop the first portion 24, 25 of the eccentrical element 4 respectively with a semi-circular inner surface 33, 34 as can be derived e.g. from FIG. 4 and are configured flat at least in portions.

The eccentrical element lever segments 29, 30 are advantageously configured from a steel investment cast material and produced by a fine stamping process. The flat connection sections 31, 32 facilitate a simplified and improved fabrication process with a lower scrap rate. Alternatively the eccentrical element lever 3 can be produced by a metal injection molding process (MIM).

Furthermore total mass of the connecting rod 1, in particular an oscillating connecting rod mass can be significantly reduced by this measure. The eccentrical element 4 can be oriented steeper and can thus become lighter. This in turn has a positive effect upon possible vibrations of the connecting rod 1 and thus upon fuel burn of the internal combustion engine which is operated with the connecting rod 1.

A clear space in the cylinder piston can be increased further which facilitates using a less expensive installation space optimized combustion piston.

The eccentrical element lever 3 or its eccentrical element lever segments 29, 30 are provided welded together with the eccentrical element 4. A laser welding method is advantageously used as a welding method. The laser welding method is simplified by the invention since the entire weld seam is in a two dimensional plane and the employed laser head does not have to travel along a three dimensional contour. Advantageously the eccentrical element lever 3 is welded together with the eccentrical element 4 along the inner surface 33, 34 of the eccentrical element lever segments 29, 30.

Since a weld seam in a beveled eccentrical element section is omitted less heat is introduced into the components during the laser welding process so that reduced warpage can be obtained.

The support rods 10, 11 are pivotably linked at the eccentrical element lever 3 in the illustrated embodiment by connecting bolts 35, 36, advantageously cylindrical rollers.

Alternatively also a ball joint connection is conceivable according to the invention, wherein the ball joint connection is advantageously used for a non-illustrated one piece embodiment of the eccentrical element lever 3. Based on the one piece fabrication of the eccentrical element lever 3 complex assembly of plural eccentrical element lever segments is not necessary and assembly deviations are irrelevant. During the fabrication process only the total tolerance of the casting process and the precision of the subsequent finishing, e.g. sintering is relevant which is very high due to the process. The shrinkage occurring during sintering can be incorporated into the tool as an oversize. Also the geometry of the eccentrical element lever 3 can be implemented in many varieties.

The one piece eccentrical element lever 3 includes two eccentrical element lever segments which are connected at diametrically arranged end portions. The support rods 10, 11 can be supported at the eccentrical element lever 3 and secured against separation by at least one safety element and can thus be secured against falling out or being lost from the eccentrical element lever 3. Thus, the eccentrical element lever 3 can include a receiving portion configured as a ball head receiver to support a ball head of the support rods 10, 11, wherein the safety element is provided at the receiving portion to secure the ball head against sliding out of the receiving portion. In the receiving portion the safety element is arranged for example radially inward protruding wherein the safety element is movable from a first position for introducing the ball head into the receiving portion into a radially inward protruding position for securing the ball head in the receiving portion. Moving the safety element into the radially inward protruding position can thus be performed before or after the assembly of the eccentrical element lever 3 in the connecting rod 1. The safety element can be configured as one or plural lobes which partially reach around the ball head of the support rods 10, 11 after being bent over. Thus, it is possible for the support rods 10, 11 to move in a particularly large angle range relative to the eccentrical element lever 3.

Figure 6:
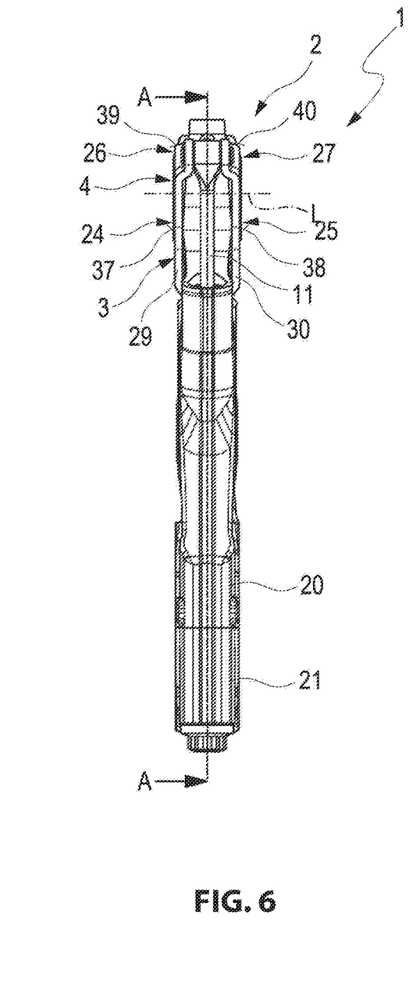
FIG. 6 illustrates a side view of the connecting rod according to the invention in a second position with a designated sectional plane A-A.
Figure 8:
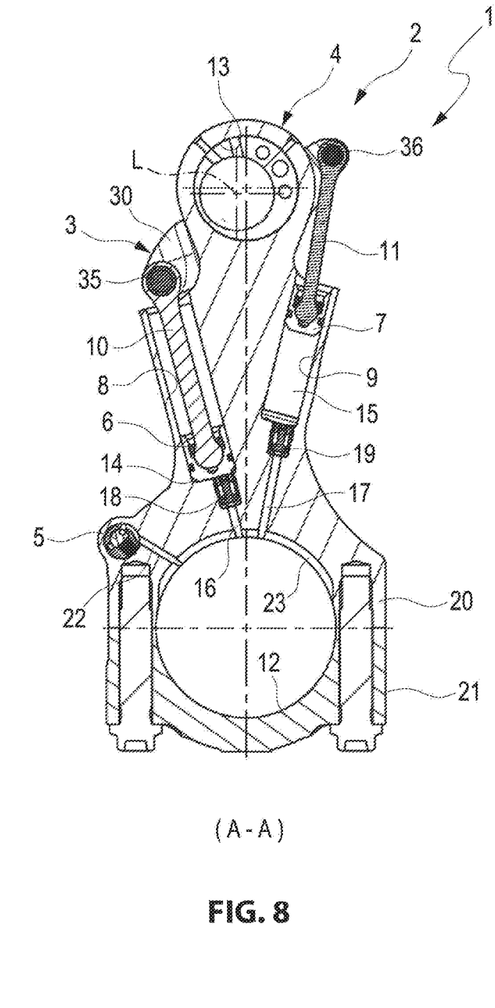
FIG. 8 illustrates a longitudinal sectional view in the sectional plane A-A of the connecting rod according to FIG. 6.
Figure 9:
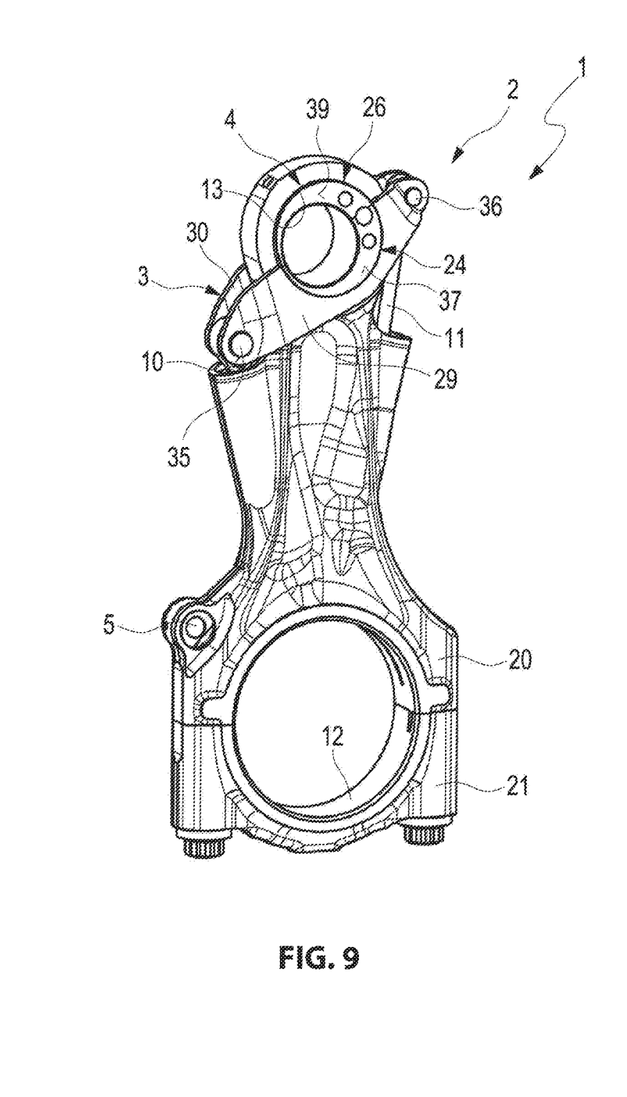
FIG. 9 Illustrates a perspective view according to FIG. 6.

FIG. 6 illustrates a side view of the connecting rod 1 according to the invention in a second position for low compression with the sectional plane A-A designated. FIG. 7 illustrates a front view of the connecting rod 1 according to FIG. 6, whereas FIG. 8 illustrates a longitudinal sectional view of the connecting rod 1 in the sectional plane A-A of the connecting rod according to FIG. 6 and FIG. 9 illustrates a perspective view of the connecting rod 1 according to FIG. 6. The position of the eccentrical element adjustment arrangement 2 corresponds to a low compression of the internal combustion engine. Thus, the effective connecting rod length, the distance between center axis of the crank bearing eye and the center axis of the bore hole of the eccentrical element 4, the eccentrical element axis L, has a minimum value.

Figure 10:
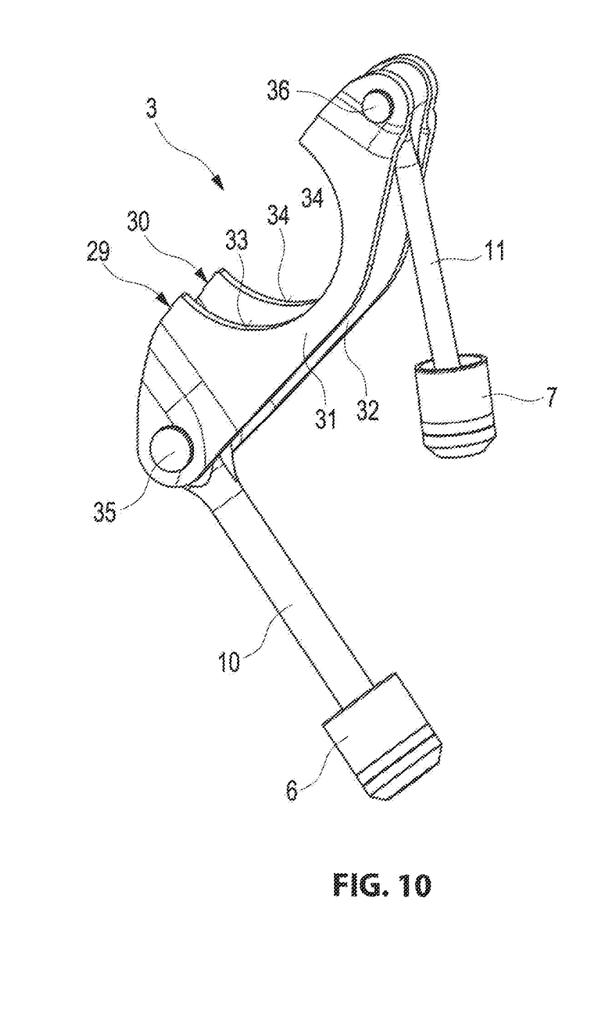
FIG. 10 Illustrates a perspective view of the eccentrical element lever with connected support rods of the connecting rod according to FIG. 6.

In FIG. 10 the eccentrical element lever 3 connected with the support rods 11 is illustrated in the respective position for low compression according to FIGS. 6-9.

What is claimed is:
1. A connecting rod for a variable compression internal combustion engine, the connecting rod comprising: a crank bearing eye for connecting the connecting rod with a crankshaft of the variable compression internal combustion engine; a connecting rod bearing eye for connecting the connecting rod with a cylinder piston of the variable compression internal combustion engine; an eccentrical element adjustment arrangement for adjusting an effective connecting rod length, wherein the eccentrical element adjustment arrangement includes an eccentrical element that cooperates with an eccentrical element lever and that is connected torque proof with the eccentrical element lever, wherein a wrist pin of the cylinder piston is receivable in the eccentrical element, wherein the eccentrical element adjustment arrangement includes two cylinders with a respective piston that is supported in a cylinder bore and connected with a respective support rod, wherein the eccentrical element lever includes one or plural eccentrical element lever segments and is pivotally connected with the support rod, wherein the connecting rod bearing eye and the eccentrical element include first circumferential portions with first face contours and second circumferential portions with second face contours, wherein the first circumferential portions extend about half of a circumference of the eccentrical element at the most, wherein the eccentrical element lever envelops the eccentrical element exclusively in the first circumferential portions of the eccentrical element and does not envelop the eccentrical element in-the second circumferential portions of the eccentrical element.

2. The connecting rod according to claim 1, wherein the first circumferential portions include face contours that are parallel to each other and the second circumferential portions include beveled face contours.

3. A connecting rod for a variable compression internal combustion engine, the connecting rod comprising:
  a crank bearing eye for connecting the connecting rod with a crankshaft of the variable compression internal combustion engine;
  a connecting rod bearing eye for connecting the connecting rod with a cylinder piston of the variable compression internal combustion engine;
  an eccentrical element adjustment arrangement for adjusting an effective connecting rod length,
  wherein the eccentrical element adjustment arrangement includes an eccentrical element that cooperates with an eccentrical element lever and that is connected torque proof with the eccentrical element lever,
  wherein a wrist pin of the cylinder piston is receivable in the eccentrical element,
  wherein the eccentrical element adjustment arrangement includes two cylinders with a respective piston that is supported in a cylinder bore and connected with a respective support rod,
  wherein the eccentrical element lever includes one or plural eccentrical element lever segments and is pivotally connected with the support rod,
  wherein the connecting rod bearing eye and the eccentrical element include first portions with first face contours and second portions with second face contours,
  wherein the eccentrical element lever envelops the eccentrical element exclusively in the first portions of the eccentrical element,
  wherein the first portions include face contours that are parallel to each other and the second portions include beveled face contours,
  wherein at least one shoulder is formed between the first face contours and the second face contours, and
  wherein the second face contours have a smaller distance from each other than the first face contours.

4. The connecting rod according to claim 1,
  wherein the eccentrical element lever includes two eccentrical element lever segments, and
  wherein the two eccentrical element lever segments include connection sections that are parallel to each other and that are connected torque proof with the eccentrical element.

5. The connecting rod according to claim 4, wherein the connection sections have a semi-circular inner surface which envelops the first portion.

6. The connecting rod according to claim 1,
  wherein the first circumferential portions are oriented towards the crank bearing eye or the second circumferential portions are oriented away from the crank bearing eye, or
  wherein the first circumferential portions are oriented towards the crank bearing eye and the second circumferential portions are oriented away from the crank bearing eye.

7. The connecting rod according to claim 1, wherein a separation line extends between the first circumferential and the second circumferential through the eccentrical element axis.

8. The connecting rod according to claim 1, wherein the connection sections are configured flat at least in portions.

9. The connecting rod according to claim 1, wherein the eccentrical element lever is made from a steel investment cast material.

10. The connecting rod according to claim 1, wherein the eccentrical element lever is produced by a metal injection molding method.

11. The connecting rod according to claim 1, wherein the eccentrical element lever and the eccentrical element lever segments are integrally configured in one piece.

12. The connecting rod according to claim 1, wherein the respective support rod is pivotably linked by a connecting bolt with the eccentrical element lever.

13. The connecting rod according to claim 1, wherein the respective support rod is pivotably linked by a ball joint with the eccentrical element lever.

14. The connecting rod according to claim 1, wherein the eccentrical element lever is welded together with the eccentrical element.

15. The connecting rod according to claim 14, wherein the eccentrical element lever is welded together with the eccentrical element along an inner surface of the eccentrical element lever.

16. An internal combustion engine, comprising: at least one connecting rod according to claim 1.

* * * * *